United States Patent
Kawashima

(10) Patent No.: US 7,054,364 B2
(45) Date of Patent: May 30, 2006

(54) MOVING PICTURE ENCODING APPARATUS AND MOVING PICTURE ENCODING METHOD

(75) Inventor: Yuji Kawashima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 679 days.

(21) Appl. No.: 10/058,406

(22) Filed: Jan. 30, 2002

(65) Prior Publication Data

US 2002/0118753 A1   Aug. 29, 2002

(30) Foreign Application Priority Data

Feb. 28, 2001   (JP) ............................. 2001-056014

(51) Int. Cl.
*H04N 7/12* (2006.01)

(52) U.S. Cl. ................................. 375/240.13
(58) Field of Classification Search ............ 375/240.12
See application file for complete search history.

(56) References Cited

U.S. PATENT DOCUMENTS 5,260,783 A   11/1993   Dixit
5,802,213 A    9/1998   Gardos (Continued)

FOREIGN PATENT DOCUMENTS

EP   0836329 A1    4/1998
FR   2691272 A1   11/1993

OTHER PUBLICATIONS

Yuji Kawashima et al., "Device and Method for Coding Video Information", U.S. Appl. No. 09/961,305, filed Sep. 25, 2001.

(Continued)

*Primary Examiner*—Vu Le
*Assistant Examiner*—Dave Czekaj
(74) *Attorney, Agent, or Firm*—Finnegan, Henderson, Farabow, Garrett & Dunner, L.L.P.

(57) ABSTRACT

An encoding section can perform moving picture compression processes by intra-coding and inter-coding. In accordance with an instruction from a code production amount control section, the encoding section divides an input VOP to MBs according to one of the moving picture compression processes by intra-coding and inter-coding, and subjects the divided MBs to encoding processing. A code production amount count section counts the code amount of a produced bit stream. A quantization scale mean value calculation section accumulates the quantization scale instructed by the code production amount control section, and calculates a mean value of the quantization scale for each VOP. The code production amount control section switches the encoding process to be carried out by the encoding section to the intra-coding process, on the basis of the code production amount, the mean value of the quantization scale and the frame skip number.

11 Claims, 4 Drawing Sheets

U.S. PATENT DOCUMENTS

| | | | |
|---|---|---|---|
| 5,872,598 A | | 2/1999 | Legall et al. |
| 5,987,180 A | * | 11/1999 | Reitmeier ................... 382/236 |
| 6,002,802 A | * | 12/1999 | Chujoh et al. ............... 382/236 |
| 6,381,373 B1 | * | 4/2002 | Suzuki et al. ................ 382/263 |
| 6,600,783 B1 | * | 7/2003 | Morita et al. ........... 375/240.03 |
| 6,625,211 B1 | * | 9/2003 | Etoh et al. ............. 375/240.03 |
| 6,684,024 B1 | * | 1/2004 | Ono et al. ..................... 386/68 |

OTHER PUBLICATIONS

Yuji Kawashima et al., "Picture Coding Apparatus and Picture Coding Method" U.S. Appl. No. 09/959,458, filed Oct. 26, 2001.

Vetro A. et al., "MPEG-4 Rate Control for Multiple Video Objects," IEEE Transactions on Circuits and Systems for Video Technology, vol. 9, No. 1, Feb. 1999, pp. 186-199, XP000802297.

Fukunaga S. et al., "MPEG-4 Video Verification Model Version 16.0;" International for Standardization—Organisation Internationale Organization De Normalisation, vol. N3312, Mar. 2000, pp. 1-380, XP000861688.

* cited by examiner

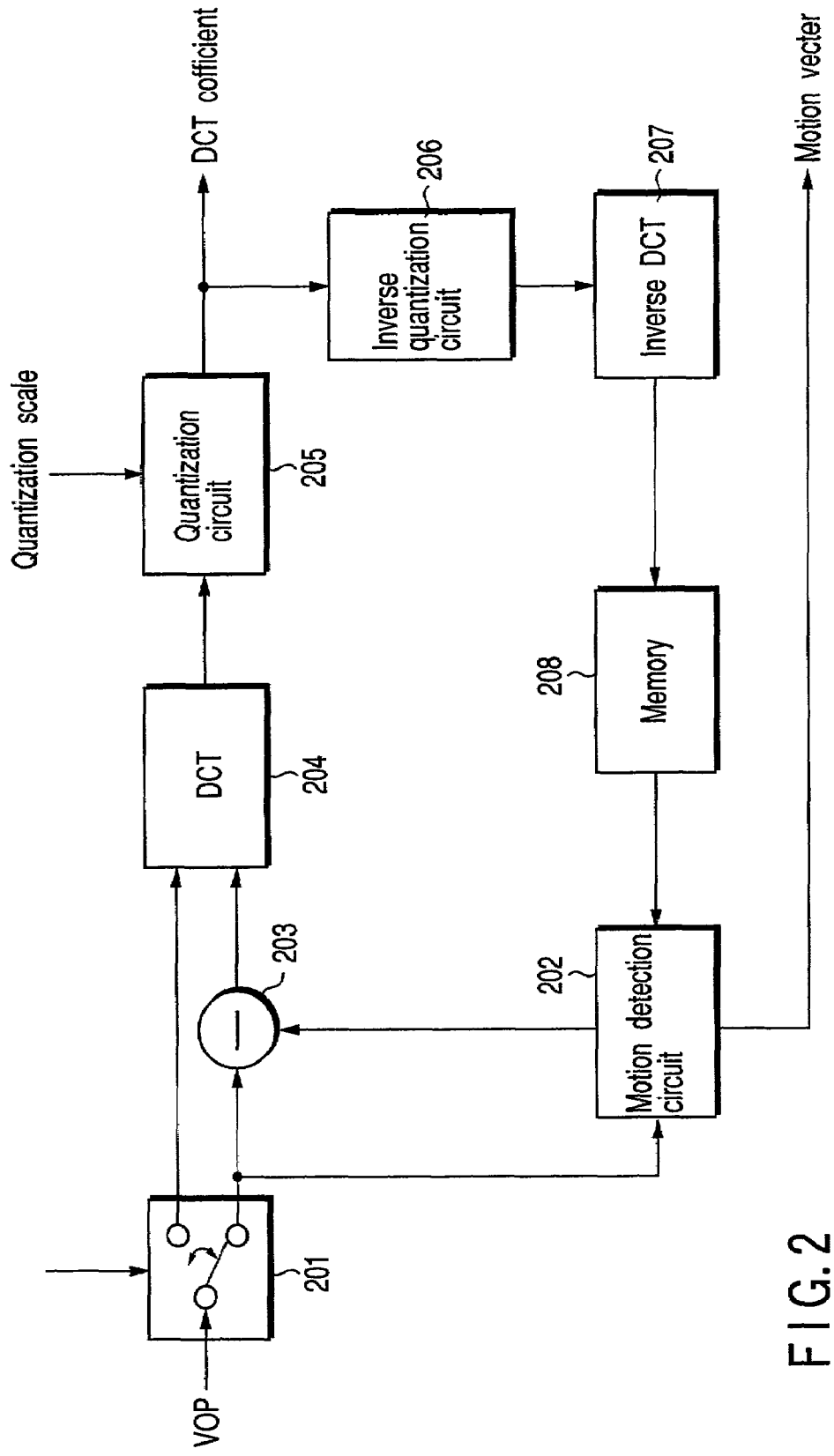
F I G. 2

MOVING PICTURE ENCODING APPARATUS AND MOVING PICTURE ENCODING METHOD

CROSS-REFERENCE TO RELATED APPLICATIONS

This application is based upon and claims the benefit of priority from the prior Japanese Patent Application No. 2001-056014, filed Feb. 28, 2001, the entire contents of which are incorporated herein by reference.

BACKGROUND OF THE INVENTION

1. Field of the Invention

The present invention relates to a moving picture encoding apparatus and a moving picture encoding method for encoding moving picture data transmitted from a network or radio communication.

2. Description of the Related Art

A moving picture encoding apparatus according to the present invention is an apparatus for performing frame-by-frame encoding, using moving picture encoding methods like ITU-T (International Telecommunication Union-Telecommunication Standardization Sector) recommendation H.26x or ISO/IEC standard MPEG, that is, motion compensation or orthogonal transform (e.g. discrete cosine transform).

In general, in the moving picture encoding method represented by the ITU-T recommendation H.26x or ISO/IEC standard MPEG, input video signals are compressed based on spatial/temporal correlations. The compressed data is subjected to variable length encoding according to a predetermined procedure, thereby producing code sequences (bit streams).

A moving picture encoding method according to MPEG-4 will now be described as an example.

A video signal comprises a plurality of video object planes (VOP). In case that a VOP has a rectangular shape, it corresponds to a frame or a field in MPEG-1, 2. The video signal is compressed based on spatial/temporal correlations of VOPs.

The VOP comprises a luminance signal and a chrominance signal. The VOP comprises a plurality of macro blocks (MB). The MB for the luminance signal consists of 16 pixels in each of vertical and horizontal axes. Spatial/temporal compression is performed in units of an MB.

DCT (Discrete Cosine Transform) and quantization are employed in the spatial compression. MC (Motion Compensation) is used in the temporal compression.

The VOP-unit compression methods include an intra-coding type (intra-coding), in which encoding is effected by only spatial compression, and an inter-coding type (inter-coding), in which encoding is effected by both spatial compression and temporal compression.

In general, the VOP subjected to the intra-coding is called an I (Intra)-VOP. As regards VOPs subjected to the inter-coding, the VOP encoded with MC, using as a reference VOP a temporally preceding encoded VOP, is called a P (Predictive)-VOP. On the other hand, the VOP encoded with bi-directional MC, using, as reference VOPs, temporally preceding and following encoded VOPs, is called a B (Bi-directionally predictive)-VOP.

The reference VOP is a VOP (two VOPs at most) temporally adjacent to the VOP to be currently encoded. The reference VOP is included in VOPs, which were encoded as I-VOPs or P-VOPs and decoded for inter-coding type.

All MBs included in the I-VOP must be encoded by intra-coding. However, the MBs included in the P-VOP or B-VOP may be encoded by either the intra-coding or the inter-coding.

According to the intra-mode/inter-mode determination of MB encoding in the MPEG-4 Video Verification Model Version 6.0 of ISO/IEC JTC1/SC29/WG11, the intra-coding is used when a sum A of all absolute values of difference values relative to an average value of all pixels of the MB and an MC error SAD meet the following condition, $$A < SAD - 2 \times N_B$$

wherein $N_B$ is the number of pixels in the MBs included in the VOP.

The MB-unit encoding process will now be described.

In case that the VOP including an MB to be encoded is an I-VOP, a quantized DCT coefficient, which is obtained by subjecting a luminance signal and a chrominance signal to DCT and quantization, is compressed by variable-length encoding, and the resultant along with header information is processed according to a predetermined procedure, thus forming a bit stream.

On the other hand, in case that the VOP including an MB to be encoded is not the I-VOP, an encoded VOP, which is temporally adjacent to the VOP including the MB to be encoded, is used as a reference VOP. Using a motion detection method represented by a block matching method, an MB in the reference VOP is found, at which a difference value (MC error) in luminance signal, relative to the MB to be encoded, is minimum.

A vector indicating motion from an MB to be encoded to an MB at which the MC error takes a minimum value is called a motion vector.

The MC error is subjected to DCT and quantization. A quantized DCT coefficient obtained in connection with the acquired motion vector and the MC of the luminance and chrominance signals is compressed by variable length encoding, and the resultant along with header information is processed according to a predetermined procedure, thus forming a bit stream.

The moving picture encoding apparatus is required to produce a bit stream having an amount of codes, which is designated by predetermined encoding parameters. In addition, in order to prevent an overflow or underflow of data in a decoder-side buffer, the encoder side has to estimate an occupation amount in the decoder-side buffer and to control the code production amount.

This buffer is called a video buffering verifier (VBV) buffer.

In MPEG-4, the upper limit of the capacity of the VBV buffer is specified by the profile and level.

The code production amount is controlled by a quantization scale for quantizing a DCT coefficient, which is obtained by subjecting frames to DCT in units of an MB.

In general terms, the code production amount is inversely proportional to the quantization scale. Making use of this feature, the code production amount can be freely varied.

Moreover, in general terms, since the quantization scale is limited, it is not possible to control the code production amount on the basis of the quantization scale alone. If the code production amount is greater than a target value, a frame skip number is increased. If not, stuffing is performed.

If the frame skip number is increased, the frame encoding timing can be delayed and underflow of the VBV buffer can be prevented. On the other hand, overflow of the VBV buffer can be prevented by insertion of redundant bits, called "stuffing."

As regards a scene with a large degree of motion, it is better to decrease the frame skip number in order to enhance the precision of prediction of motion. On the other hand, in a scene with a large degree of motion, the code production amount generally increases and underflow tends to occur in the VBV buffer.

To cope with this problem, in case that scenes with a large degree of motion continue for a relatively long time, the frame skip number has to be increased in order to prevent underflow of the VBV buffer. However, if the frame skip number is increased, the degree of correlation with the reference VOP used for MC decreases.

In a case of a scene with a particularly high degree of motion, it is highly possible that an object in an image moves to an area outside an area in which motion of an object is compensated. In this state, if predictive encoding is performed between less correlated VOPs, the motion vector increases and the MC error also increases.

The motion vector is a vector encoding a difference value from a predictive value of a motion vector, which is obtained by a motion vector between adjacent MBs (blocks). In most cases, since motion vectors of adjacent MBs or blocks are the same or similar, code sequences proportional to the difference value are assigned to these motion vectors.

As mentioned above, the MB of the inter-screen encoded VOP may be encoded by inter-coding or intra-coding. In the aforementioned estimation of less correlated VOPs, the number of intra-coded MBs is relatively large.

Taking the above into account, when the degree of correlation between the VOP to be encoded and the reference VOP is high, the difference value of the motion vector and the MC error decrease. Thus, the code production amount of the inter-coded VOP is remarkably reduced, compared to that of the intra-coded VOP.

In the prior-art moving picture encoding apparatus, in case that the correlation between the VOP to be encoded and the reference VOP is higher, the VOP is inter-coded.

On the other hand, when the frame skip number is large and the degree of correlation between the VOP to be encoded and the reference VOP is low, the number of MBs to be intra-coded according to the intra-mode/inter-mode determination of the MB encoding is relatively large. In this case, intra-coded MBs and inter-coded MBs tend to be mixed disorderly. Consequently, the motion vector prediction value of the inter-coded MB increases and the amount of codes increases. In addition, the MC error is relatively large, and the amount of codes of the VOP increases disadvantageously.

If the amount of codes increases, the frame skip number is further increases in a vicious spiral, and the efficiency in encoding deteriorates.

In the prior-art moving picture encoding apparatus, in case that the degree of correlation between the VOP to be encoded and the reference VOP is low during inter-coding, the intra-coding is performed in units of an MB. Consequently, the amount of codes of the VOP increases disadvantageously.

BRIEF SUMMARY OF THE INVENTION

The present invention has been made to solve the above problems, and its object is to provide a moving picture encoding apparatus capable of preventing an increase in the amount of codes of a VOP even when the correlation between a VOP to be encoded and a reference VOP is low.

In order to achieve the object, the present invention may provide a moving picture encoding apparatus comprising: a skip number control section which controls a skip number between frames to be encoded; a quantization scale control section which controls a quantization scale indicative of a degree of quantization; an encoding section which performs encoding of a moving picture by selectively using one of an inter-coding type process and an intra-coding type process on the basis of the quantization scale determined by the quantization scale control section and the skip number determined by the skip number control section; a code amount detection section which finds a code amount of a frame encoded by the encoding section; a storage section which stores the quantization scale with which the encoding section performs encoding by the inter-coding type process, the code amount found by the code amount detection section at this time, the quantization scale with which the encoding section performs encoding by the intra-coding type process, and the code amount found by the code amount detection section at this time; and an encoding process setting section which sets the encoding process to be performed by the encoding section to the intra-coding type process, if the skip number determined by the skip number control section is a predetermined first value or more and the quantization scale and code amount stored in the storage section satisfy a predetermined condition.

This invention may also provide a moving picture encoding method comprising: a skip number control step of controlling a skip number between frames to be encoded; a quantization scale control step of controlling a quantization scale indicative of a degree of quantization; an encoding step of performing encoding of a moving picture by selectively using one of an inter-coding type process and an intra-coding type process on the basis of the quantization scale determined by the quantization scale control step and the skip number determined by the skip number control step; a code amount detection step of finding a code amount of a frame encoded by the encoding step; a storage step of storing the quantization scale with which the encoding step executes encoding by the inter-coding type process, the code amount found by the code amount detection step at this time, the quantization scale with which the encoding step executes encoding by the intra-coding type process, and the code amount found by the code amount detection step at this time; and an encoding process setting step of setting the encoding process to be performed by the encoding step to the intra-coding type process, if the skip number determined by the skip number control step is a predetermined first value or more and the quantization scale and code amount stored in the storage step satisfy a predetermined condition.

According to the above-described moving picture encoding apparatus and method, the quantization scale and code amount in each of the inter-coding type process and intra-coding type process are stored. The encoding by the intra-coding type process is performed when the skip number in the encoding is a predetermined first value or more and the stored quantization scale and code amount satisfy a predetermined condition.

Thus, according to the moving picture encoding apparatus with the above structure, when the skip number has increased and the quantization scale and code amount in the already executed inter-coding type process and intra-coding type process satisfy a predetermined condition, the encoding by the intra-coding type process is performed. It is possible to prevent the problem in the prior art that many intra-coded MBs are used in the executed inter-coding and the precision in motion prediction lowers, resulting in an increase in the amount of codes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a circuit block diagram showing the structure of a signal processing section of the moving picture encoding apparatus shown in FIG. 1;

DETAILED DESCRIPTION OF THE INVENTION

Embodiments of the present invention will now be described with reference to the accompanying drawings.

Figure 1:
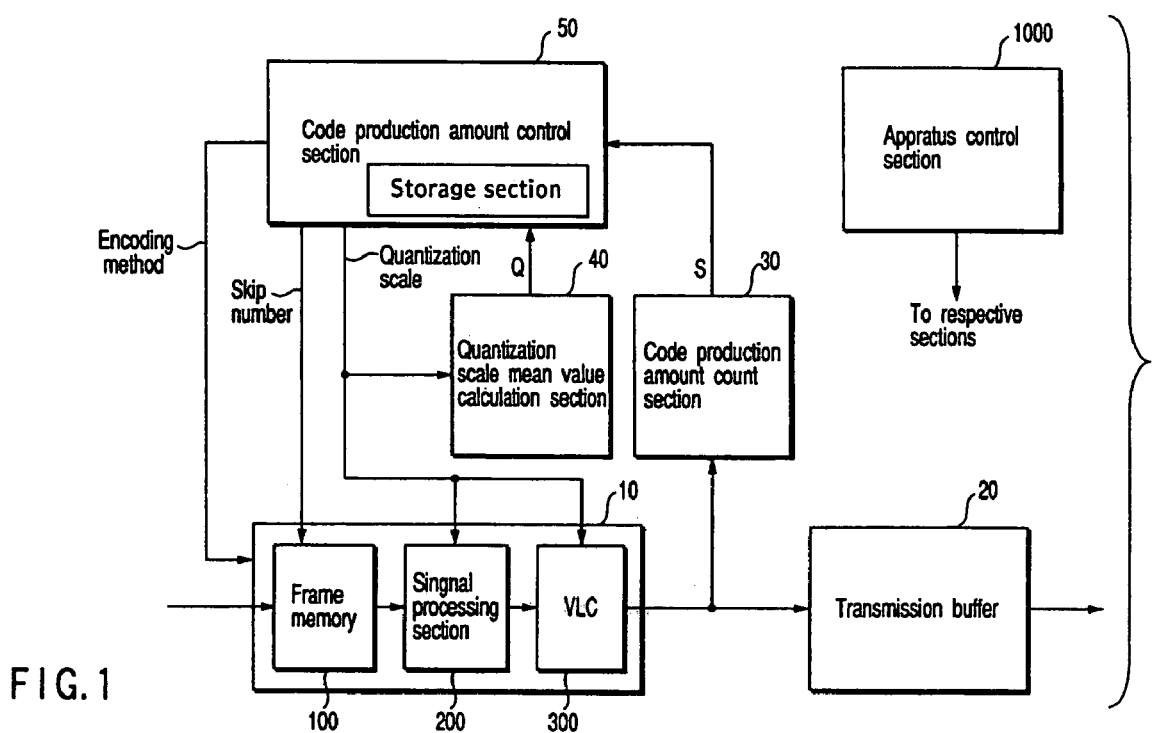
FIG. 1 is a circuit block diagram showing the structure of a moving picture encoding apparatus according to an embodiment of the present invention.

FIG. 1 shows the structure of a moving picture encoding apparatus according to an embodiment of the invention.

The moving picture encoding apparatus comprises an encoding section 10, a transmission buffer 20, a code production amount count section 30, a quantization scale mean value calculation section 40, a code production amount control section 50, and an apparatus control section 1000.

The apparatus control section 1000 comprises a microprocessor and controls the respective sections. For example, the apparatus control section 1000 executes an input control of an image signal (VOP) input to the moving picture encoding apparatus, and an output control of a bit stream generated by the encoding of the moving picture encoding apparatus.

The output control of the bit stream includes setting of a target code production amount (hereinafter referred to as "target bit rate") or a target frame rate, and setting of encoding modes such as a rate control and an error resistance.

The encoding section 10 can perform moving picture compression processes by intra-coding and inter-coding. In accordance with an instruction from the code production amount control section 50 (to be described later), the encoding section 10 divides an input VOP to MBs according to one of the moving picture compression processes by intra-coding and inter-coding, and subjects the divided MBs to encoding processing. The encoding section 10 comprises a frame memory 100, a signal processing section 200 and a variable length coder (VLC) 300.

The moving picture compression in this context is, for example, ISO/IEC standard MPEG-4, ITU-T recommendation H.263, or a modification thereof.

The frame memory 100 temporarily stores the input VOP. In case that a skip number is instructed from the code production amount control section 50, the frame memory 100 skip-outputs the stored VOP in accordance with the value of the skip number.

In accordance with an instruction from the code production amount control section 50, the signal processing section 200 compresses the VOP from the frame memory 100 in units of an MB by intra-coding or inter-coding, thus finding macro block information (DCT coefficient, motion vector).

FIG. 2 shows the structure of the signal processing section 200.

A change-over switch 201 selectively outputs the VOP from the frame memory 100 to a first output terminal or a second output terminal in accordance with the type of encoding instructed by the code production amount control section 50. In case that the inter-coding is requested by the code production amount control section 50, the change-over switch 201 outputs the VOP to the first output terminal. In case that the intra-coding is requested by the code production amount control section 50, the change-over switch 201 outputs the VOP to the second output terminal.

The VOP output to the first output terminal is delivered to a motion detection circuit 202 and a subtracter 203. The VOP output to the second output terminal is delivered to a discrete cosine transform circuit (DCT) 204.

The motion detection circuit 202 finds an MB-unit motion vector on the basis of the VOP, which was output from a memory 208 (to be described later) and encoded in a process preceding by one sample. The obtained motion vector is output to the variable length coder 300 of the rear stage and to the subtracter 203.

The subtracter 203 finds a difference between the MB of the VOP input from the change-over switch 201 and the MB of a reference VOP indicated by the motion vector found by the motion detection circuit 202. The subtracter 203 delivers the found difference to the discrete cosine transform circuit 204.

The discrete cosine transform circuit 204 subjects the input signals to discrete cosine transform, and delivers the transformed result to a quantization circuit 205.

The quantization circuit 205 quantizes the transformed result of the discrete cosine transform circuit 204 on a quantization scale instructed by the code production amount control section 50 and produces a DCT coefficient. The DCT coefficient is delivered to the variable length coder 300 of the rear stage and to an inverse quantization circuit 206.

The DCT coefficient is inverse-quantized. The inverse-quantized result is subjected to inverse cosine transform in an inverse cosine transform circuit 207. The output from the inverse cosine transform circuit 207 is temporarily stored in the memory 208 as a reference VOP, and is output to the motion detection circuit 202.

The variable length coder 300 compresses the macro block information (DCT coefficient, motion vector) found by the signal processing section 200 by means of variable length coding according to a predetermined syntax. The compressed result along with header information is processed according to a predetermined procedure to produce a bit stream.

If a stuffing bit number is instructed by the code production amount control section 50, the variable length coder 300 performs stuffing corresponding to the bit number in accordance with a predetermined syntax.

The bit stream is delivered to the transmission buffer 20 and code production amount count section 30.

The transmission buffer 20 temporarily stores the bit stream and outputs the stored bit stream according to a target bit rate set by the apparatus control section 1000.

The code production amount count section 30 counts the code amount of the bit stream produced by the encoding section 10, and tells the count value to the code production amount control section 50.

The quantization scale mean value calculation section 40 accumulates the quantization scale instructed by the code production amount control section 50, calculates a mean value of the quantization scale for each VOP, and tells the mean value to the code production amount control section 50.

Based on the code production amount S told by the code production amount count section 30, the mean value Q of the quantization scale told by the quantization scale mean value calculation section 40 and the occupation amount of the VBV buffer found by the code production amount control section 50, the code production amount control section 50 determines the frame skip number up to the VOP to be next encoded, the encoding process for the VOP, and the stuffing bit number. The code production amount control section 50 delivers the determined results to the encoding section 10.

The code production amount control section 50 can calculate the occupation amount of the VBV buffer, on the basis of the code production amount from the code production amount count section 30, the target bit rate from the apparatus control section 1000 and the time from the start of the encoding process.

The code production amount control section 50 stores the code production amount and the mean value of the quantization scale for each executed encoding process (inter-coding and intra-coding). Based on the stored information and the frame skip number, the code production amount control section 50 switches the encoding method in the encoding section 10 to the intra-coding.

The operation of the moving picture encoding apparatus with the above structure will now be described.

Like the prior art, the moving picture encoding apparatus of this embodiment executes the control of the quantization scale, the control of the frame skip number and the stuffing so as to meet the requirement of limitation of the VBV buffer. A description of these controls is omitted here.

Figure 3:
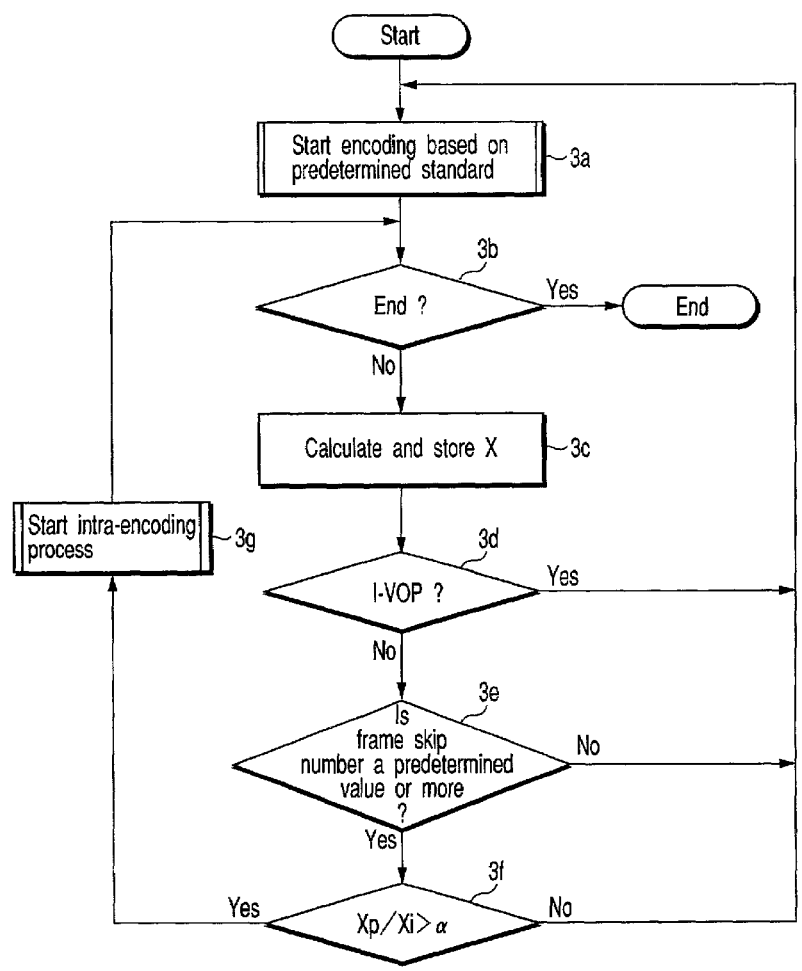
FIG. 3 is a flow chart illustrating a switching control for encoding in the moving picture encoding apparatus shown in FIG. 1.

A description will now be given of the switching control of the encoding process in the encoding section 10 according to the invention. This control is executed by the code production amount control section 50. FIG. 3 is a flow chart illustrating the switching control operation. This operation is repeated for each VOP after the start-up of the apparatus until the stop of the apparatus.

In step 3a, for example, on the basis of a conventional standard, the encoding process is determined, and an instruction is given to the encoding section 10 so as to execute an encoding process according to the determined encoding process. Control then goes to step 3b. Thereby, the encoding section 10 starts the encoding process according to the determined encoding process.

In step 3b, it is monitored whether an instruction to finish the operation of the present apparatus has been received. If the instruction to finish the operation of the present apparatus has been received, the present process is finished. If the instruction to finish the operation of the present apparatus has not been received, the encoding process is continued and control advances to step 3c.

In step 3c, a product X is found. The product X is a product of a code production amount S told by the code production amount count section 30 and a quantization scale mean value Q told by the quantization scale mean value calculation section 40.

The value X is known as a global complexity measure of ISO/IEC standard Video CODEC Test Model Version 5 (TM5).

Assume that the code production amount of I-VOP is Si, the quantization scale mean value is Qi, and a product of both is Xi. Similarly, assume that the code production amount of P-VOP is Sp, the quantization scale mean value is Qp, and a product of both is Xp.

In step 3c, the value of X (Xi or Xp) of the currently performed encoding is found. The code production amount control section 50 stores the latest value of X, and control goes to step 3d. However, the code production amount control section 50 stores the latest value of X for each encoding process.

In step 3d, it is determined whether the next encoding process is intra-coding or not. If the next encoding process is intra-coding, control goes to step 3a. If not, control goes to step 3e.

In step 3e, it is determined whether or not the frame skip number is a predetermined value or more. If the frame skip number is a predetermined value or more, control goes to step 3f. On the other hand, if the frame skip number is less than the predetermined value, control goes to step 3a.

In step 3f, the ratio of the stored Xp to the stored Xi (Xp/Xi) is found. It is determined whether the ratio is greater than a predetermined value $\alpha$ (>0). If the ratio is greater than a predetermined value $\alpha$, control goes to step 3g. If the ratio is the predetermined value $\alpha$ or less, control goes to step 3a.

In step 3g, an instruction to start the intra-coding process is given to the encoding section 10. Then, control goes to step 3b. Thus, the encoding section 10 starts the intra-coding process.

As has been described above, in the moving picture encoding apparatus with the above structure, the latest value of product X (Xi, Xp) between the code production amount S and quantization scale mean value Q is stored for each encoding process. If Xp/Xi>$\alpha$ in case that the inter-coding is performed with the frame skip number higher than a predetermined value, the current inter-coding is switched to the intra-coding.

More specifically, in the moving picture encoding apparatus with the above structure, if the frame skip number increases and the correlation between VOPs decreases, it is confirmed that the product of the code production amount S and quantization scale mean value Q in the case of the intra-coding is smaller than that in the case of the inter-coding. Then, the inter-coding is switched to the intra-coding.

Thus, it is possible to prevent the problem in the prior art that many intra-coded MBs are used in the continued inter-coding and the precision in motion prediction lowers, resulting in an increase in the amount of codes.

According to the moving picture encoding apparatus with the above structure, even if the frame skip number increases and the correlation between VOPs decreases, an increase in the amount of codes of whole VOPs can be prevented. Thus, the frame skip number can be decreased, and the encoding efficiency enhanced. Moreover, the error resistance in the intra-coding can be increased.

The present invention is not limited to the above embodiment.

In the present invention, the product X of the code production amount S and quantization scale mean value Q is found for each of different encoding processes, and the respective products X are compared. The encoding process with the lower product X is executed. If this characterizing structure is adopted, various modifications are possible.

For example, in the above embodiment, the value α is a constant. However, considering the fact that the correlation between VOPs is varied according to the frame skip number, the value α may be a function of the frame skip number, as given below:

$$\alpha = f(\text{frameSkip}(t))$$

wherein t is time, and frameSkip(t) is a frame skip number in VOP at time t.

As regards the frame skip number, only a frame skip number from the VOP encoded immediately before in time is used. However, as given by the equation below, the value α may be determined using the previous frame skip number:

$$\alpha = f(\text{frameSkip}(t), \text{frameSkip}(t-t0))$$

Besides, in the above embodiment, the encoding section 10 selectively executes one of the inter-coding and intra-coding. The invention is not limited to this, and it is applicable to bi-directional predictive encoding.

Figure 4:
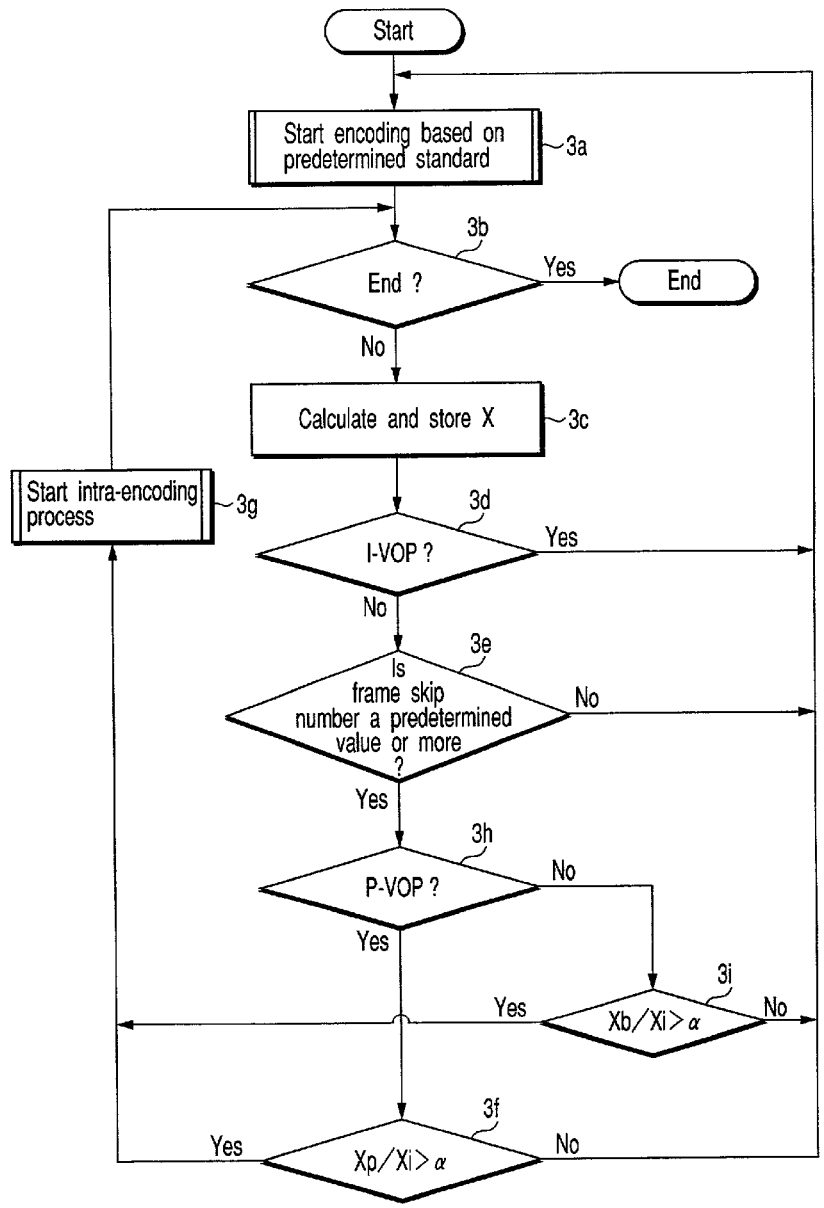
FIG. 4 is a flow chart illustrating a switching control for encoding in the moving picture encoding apparatus shown in FIG. 1.

In this case, as shown in FIG. 4, steps 3h and 3i are added to the process illustrated in FIG. 3.

In the process of FIG. 4, in step 3e, it is determined whether or not the frame skip number is a predetermined value or more. If the frame skip number is a predetermined value or more, control goes to step 3h. On the other hand, if the frame skip number is less than the predetermined value, control goes to step 3a.

In step 3h, it is determined whether the next encoding process is inter-coding or not. If the next encoding process is inter-coding, control goes to step 3f. If not, control goes to step 3i.

Assume that the code production amount of B-VOP is Sb, the quantization scale mean value is Qb, and a product of both is Xb.

In step 3i, the ratio of the stored Xb to the stored Xi (Xb/Xi) is found. It is determined whether the ratio is greater than a predetermined value α (>0). If the ratio Xb/Xi is greater than a predetermined value α, control goes to step 3g. If the ratio Xb/Xi is the predetermined value α or less, control goes to step 3a.

According to the above process, even where the bi-directional predictive encoding process is performed, the bi-directional predictive encoding is switched to the intra-coding, if the frame skip number increases and the correlation between VOPs lowers and it is confirmed that the product of the code production amount S and quantization scale Q in the case of the intra-coding is smaller than that in the case of the bi-directional predictive encoding. Thus, it is possible to prevent the problem in the prior art that many intra-coded MBs are used in the continued inter-coding.

In the above embodiment, the code production amount control section 50 stores the latest value of product X between the code production amount S and quantization scale mean value Q for each encoding process, and the respective latest values are compared. Alternatively, plural encoding processes may be performed in parallel, and products X for the same VOP may be obtained. These products X may be compared to switch the encoding process.

The respective sections shown in FIG. 1 may be made by hardware. Alternatively, the functions of these sections may be realized by high-speed microprocessors and memories storing software.

Needless to say, other various modifications may be made without departing from the spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A moving picture encoding apparatus comprising:
   a skip number control section which controls a skip number between frames to be encoded;
   a quantization scale control section which controls a quantization scale indicative of a degree of quantization;
   an encoding section which encodes a moving picture, by selectively using one of an inter-coding and an intra-coding, on the basis of the quantization scale determined by the quantization scale control section and the skip number determined by the skip number control section;
   a code amount detection section which calculates a code amount of a frame encoded by the encoding section;
   a storage section which stores the quantization scale with which the encoding section encodes by the inter-coding, the code amount of the inter-coding calculated by the code amount detection section, the quantization scale with which the encoding section encodes by the intra-coding, and the code amount of the intra-coding calculated by the code amount detection section; and
   an encoding setting section which sets the encoding to be used by the encoding section to the intra-coding, if the skip number determined by the skip number control section has reached at least a predetermined first threshold while the encoding section is encoding by the inter-coding, and if the ratio of a product of a mean value of the quantization scale and the code amount of the inter-coding stored in the storage section to a product of a mean value of the quantization scale and the code amount of the intra-coding stored in the storage section is greater than a predetermined second threshold.

2. The moving picture encoding apparatus according to claim 1, wherein the inter-coding is at least one of a unidirectional predictive encoding and a bi-directional predictive encoding.

3. The moving picture encoding apparatus according to claim 1, wherein said second threshold is a fixed threshold or a variable threshold according to the skip number determined by the skip number control section.

4. The moving picture encoding apparatus according to claim 1, further comprising an averaging section which calculates a mean value of the quantization scale determined by the quantization scale control section,
   wherein the storage section stores the mean value obtained by the averaging section as the quantization scale.

5. A moving picture encoding method comprising:
   skip number control step of controlling a skip number between frames to be encoded;

quantization scale control step of controlling a quantization scale indicative of a degree of quantization;

encoding step of encoding of a moving picture, by selectively using one of an inter-coding and an intra-coding, on the basis of the quantization scale determined by the quantization scale control step and the skip number determined by the skip number control step;

code amount detection step of calculating a code amount of a frame encoded by the encoding step;

storing step of storing the quantization scale with which the encoding step executes encoding by the inter-coding, the code amount of the inter-coding calculated by the code amount detection step, the quantization scale with which the encoding step executes encoding by the intra-coding, and the code amount of the intra-coding calculated by the code amount detection step; and encoding setting step of setting the encoding to be used by the encoding step to the intra-coding, if the skip number determined by the skip number control step has reached at least a predetermined first threshold while the encoding step is executing the encoding by the inter-coding, and if the ratio of a product of a mean value of the quantization scale and the code amount of the inter-coding stored in the storing step to a product of a mean value of the quantization scale and the code amount of the intra-coding stored in the storing step is greater than a predetermined second threshold.

6. The moving picture encoding method according to claim 5, wherein the inter-coding is at least one of a unidirectional predictive encoding and a bi-directional predictive encoding.

7. The moving picture encoding method according to claim 5, wherein said second threshold is a fixed threshold or a variable threshold according to the skip number determined by the skip number control step.

8. The moving picture encoding method according to claim 5, further comprising an averaging step which calculates a mean value of the quantization scale determined by the quantization scale control step, wherein the storage step stores the mean value obtained by the averaging step as the quantization scale.

9. A moving picture encoding apparatus comprising:

skip number control means for controlling a skip number between frames to be encoded;

quantization scale control means for controlling a quantization scale indicative of a degree of quantization;

encoding means for encoding a moving picture, by selectively using one of an inter-coding and an intra-coding, on the basis of the quantization scale and the skip number;

code amount detection means for determining a code amount of a frame encoded by the encoding means;

storage means for storing a product of a mean value of the quantization scale set by the quantization scale control means and the code amount determined by the code amount detection means, the product determined with respect to each frame; and encoding setting means for setting encoding, wherein if the skip number is equal to or greater than a predetermined threshold value and if encoding after skipping frames is inter-coding, a value indicative of a product stored in the storage means and determined with respect to frames which have been subjected to inter-coding is compared with a value indicative of a product stored in the storage means and determined with respect to frames which have been subjected to intra-coding, and wherein said encoding performed after skipping frames is set to intra-coding if the value indicative of a product determined with respect to frames which have been subjected to intra-coding is smaller than the value indicative of a product determined with respect to frames which have been subjected to inter-coding.

10. The moving picture encoding apparatus according to claim 9, wherein the inter-coding is at least one of a forward direction predictive encoding and a bi-directional predictive encoding.

11. The moving picture encoding apparatus according to claim 9, wherein the encoding setting means determines a product of the code amount and a mean value of the quantization scale, with respect to every inter-coding and intra-coding, and storing the product in the storage means.

* * * * *

UNITED STATES PATENT AND TRADEMARK OFFICE
CERTIFICATE OF CORRECTION

PATENT NO. : 7,054,364 B2
APPLICATION NO. : 10/058406
DATED : May 30, 2006
INVENTOR(S) : Kawashima It is certified that error appears in the above-identified patent and that said Letters Patent is hereby corrected as shown below:

column 12, line 19, delete "value".

Signed and Sealed this

Eighth Day of August, 2006

JON W. DUDAS
*Director of the United States Patent and Trademark Office*